(12) United States Patent
Liu et al.

(10) Patent No.: US 11,507,190 B2
(45) Date of Patent: Nov. 22, 2022

(54) GESTURE CONTROL METHOD APPLIED TO VR DEVICE, AND APPARATUS

(71) Applicant: Huawei Technologies Co., Ltd., Shenzhen (CN)

(72) Inventors: Siwei Liu, Beijing (CN); Wenliang Chang, Shenzhen (CN); Hongkun Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 16/259,240

(22) Filed: Jan. 28, 2019

(65) Prior Publication Data

US 2019/0155397 A1 May 23, 2019

Related U.S. Application Data (63) Continuation of application No. PCT/CN2017/071387, filed on Jan. 17, 2017.

(30) Foreign Application Priority Data

Jul. 26, 2016 (CN) .......................... 201610595123.3

(51) Int. Cl.
*G06F 3/048* (2013.01)
*G06F 3/01* (2006.01)
(Continued)

(52) U.S. Cl.
CPC ........... *G06F 3/017* (2013.01); *G02B 27/017* (2013.01); *G06F 3/011* (2013.01); *G06F 3/0304* (2013.01);
(Continued)

(58) Field of Classification Search
CPC .......... G06F 3/048; G06F 3/017; G06F 3/011; G06F 3/0304; G06F 3/04817;
(Continued)

(56) References Cited

U.S. PATENT DOCUMENTS 7,834,847 B2 * 11/2010 Boillot .................... G06F 3/017
345/173
10,281,987 B1 * 5/2019 Yang .................. G06F 3/04847
(Continued)

FOREIGN PATENT DOCUMENTS

| CN | 102681748 A | 9/2012 |
|---|---|---|
| CN | 102693063 A | 9/2012 |

(Continued)

OTHER PUBLICATIONS

Machine Translation and Abstract of Chinese Publication No. CN102681748, Sep. 19, 2012, 16 pages.
(Continued)

*Primary Examiner* — Xuyang Xia
(74) *Attorney, Agent, or Firm* — Conley Rose, P.C.

(57) ABSTRACT

A gesture control method applied to a virtual reality (VR) device, where gesture location information of a user of the VR device is obtained, a depth distance from a depth sensor to a hand of the user is detected using the depth sensor, and a hand movement area of the user is divided into a selection area and a command area based on a result of comparing the depth distance with a preset depth threshold. When the detected depth distance is not greater than the preset depth threshold, the user may select a to-be-operated object on a current display page, and when the detected depth distance is greater than the preset depth threshold, the user may perform a command operation on the to-be-operated object.

20 Claims, 4 Drawing Sheets

(51) Int. Cl.

| | | |
|---|---|---|
| *G06F 3/04842* | (2022.01) | |
| *G06F 3/03* | (2006.01) | |
| *G02B 27/01* | (2006.01) | |
| *G06F 3/04817* | (2022.01) | |
| *G06F 3/0482* | (2013.01) | |
| *G06F 3/0483* | (2013.01) | |
| *G06F 3/0484* | (2022.01) | |
| *G06T 19/00* | (2011.01) | |

(52) U.S. Cl.
CPC ............ *G06F 3/048* (2013.01); *G06F 3/0482* (2013.01); *G06F 3/0483* (2013.01); *G06F 3/0484* (2013.01); *G06F 3/04817* (2013.01); *G06F 3/04842* (2013.01); *G06T 19/006* (2013.01)

(58) Field of Classification Search
CPC .... G06F 3/0482; G06F 3/0483; G06F 3/0484; G06F 3/04842; G02B 27/017; G06T 19/006
See application file for complete search history.

(56) References Cited

U.S. PATENT DOCUMENTS

| | | | | |
|---|---|---|---|---|
| 2012/0268373 | A1* | 10/2012 | Grzesiak | G06F 3/017 345/158 |
| 2012/0326961 | A1 | 12/2012 | Bromer et al. | |
| 2012/0326995 | A1 | 12/2012 | Zhang et al. | |
| 2014/0078176 | A1 | 3/2014 | Kim et al. | |
| 2014/0225918 | A1 | 8/2014 | Mittal et al. | |
| 2014/0282278 | A1 | 9/2014 | Anderson et al. | |
| 2015/0042680 | A1 | 2/2015 | Grossinger et al. | |
| 2015/0346495 | A1 | 12/2015 | Welch et al. | |
| 2015/0363070 | A1* | 12/2015 | Katz | G06F 3/017 715/852 |
| 2016/0012631 | A1* | 1/2016 | Kim | G09G 5/38 345/419 |
| 2016/0027212 | A1* | 1/2016 | Da Veiga | H04N 13/344 345/633 |
| 2016/0048725 | A1 | 2/2016 | Holz et al. | |
| 2016/0219165 | A1* | 7/2016 | Iezaki | G02B 27/017 |
| 2016/0291327 | A1 | 10/2016 | Kim et al. | |
| 2016/0341968 | A1* | 11/2016 | Cricri | G02B 27/0179 |
| 2017/0262150 | A1 | 9/2017 | Wong et al. | |
| 2017/0270715 | A1* | 9/2017 | Lindsay | G06T 7/70 |
| 2017/0277400 | A1* | 9/2017 | Lee | G06F 3/0482 |
| 2018/0005443 | A1* | 1/2018 | Poulos | G06F 3/017 |

FOREIGN PATENT DOCUMENTS

| | | |
|---|---|---|
| CN | 102841733 A | 12/2012 |
| CN | 103246351 A | 8/2013 |
| CN | 103677240 * | 3/2014 |
| CN | 103677240 A | 3/2014 |
| CN | 103946734 A | 7/2014 |
| CN | 103970460 A | 8/2014 |
| CN | 104345802 A | 2/2015 |
| CN | 104793744 A | 7/2015 |
| CN | 204537054 U | 8/2015 |
| CN | 104969148 A | 10/2015 |
| CN | 105068649 A | 11/2015 |
| CN | 105302294 A | 2/2016 |
| CN | 105446481 A | 3/2016 |
| CN | 105578250 A | 5/2016 |
| CN | 205302188 U | 6/2016 |
| CN | 106249882 A | 12/2016 |
| WO | 2015053449 A1 | 4/2015 |

OTHER PUBLICATIONS

Machine Translation and Abstract of Chinese Publication No. CN102693063, Sep. 26, 2012, 24 pages.
Machine Translation and Abstract of Chinese Publication No. CN103677240, Mar. 26, 2014, 19 pages.
Machine Translation and Abstract of Chinese Publication No. CN104793744, Jul. 22, 2015, 18 pages.
Machine Translation and Abstract of Chinese Publication No. CN105068649, Nov. 18, 2015, 8 pages.
Machine Translation and Abstract of Chinese Publication No. CN105302294, Feb. 3, 2016, 30 pages.
Machine Translation and Abstract of Chinese Publication No. CN105446481, Mar. 30, 2016, 15 pages.
Machine Translation and Abstract of Chinese Publication No. CN105578250, May 11, 2016, 18 pages.
Machine Translation and Abstract of Chinese Publication No. CN106249882, Dec. 21, 2016, 22 pages.
Machine Translation and Abstract of Chinese Publication No. CN205302188, Jun. 8, 2016, 11 pages.
Foreign Communication From A Counterpart Application, Chinese Application No. 201610595123.3, Chinese Office Action dated Jul. 2, 2018, 9 pages.
Foreign Communication From A Counterpart Application, Chinese Application No. 2016105951233, Chinese Search Report dated Jun. 24, 2018, 2 pages.
Foreign Communication From A Counterpart Application, PCT Application No. PCT/CN2017/071387, English Translation of International Search Report dated Apr. 26, 2017, 2 pages.
Foreign Communication From A Counterpart Application, PCT Application No. PCT/CN2017/071387, English Translation of Written Opinion dated Apr. 26, 2017, 5 pages.

* cited by examiner

GESTURE CONTROL METHOD APPLIED TO VR DEVICE, AND APPARATUS

CROSS-REFERENCE TO RELATED APPLICATIONS

This application is a continuation of International Patent Application No. PCT/CN2017/071387 filed on Jan. 17, 2017, which claims priority to Chinese Patent Application No. 201610595123.3 filed on Jul. 26, 2016. The disclosures of the aforementioned applications are hereby incorporated by reference in their entireties.

TECHNICAL FIELD

The present disclosure relates to the field of communications technologies, and in particular, to a gesture control method applied to a VR device, and an apparatus.

BACKGROUND

A virtual reality (VR) technology and an augmented reality (AR) technology are emerging multimedia technologies in recent years. The VR technology is a computer simulation system that can provide establishment and experience of a virtual world. The AR technology is a technology that can superimpose VR and real world for interaction.

Figure 1:
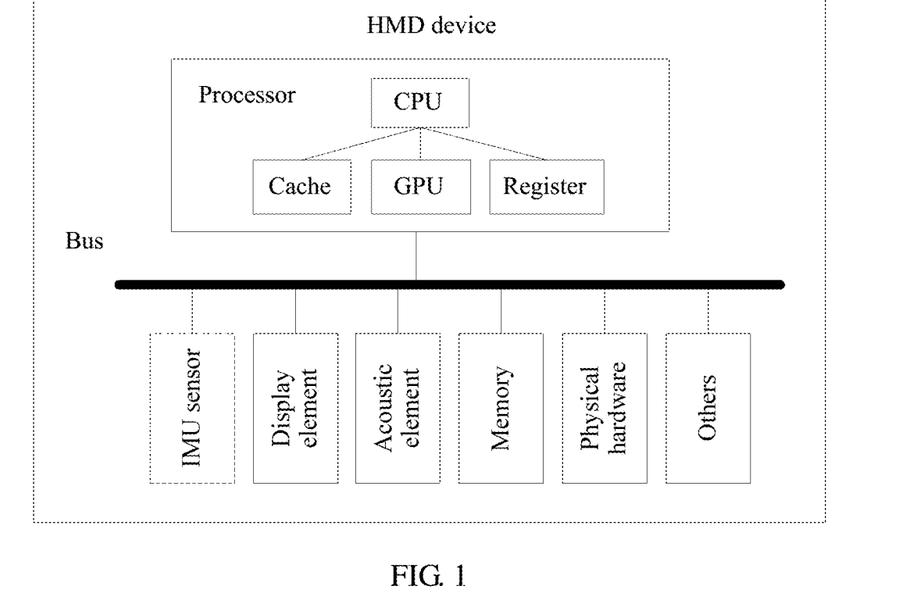
FIG. 1 is a schematic diagram of a commonly seen HMD device.

In a VR scenario or an AR scenario, a user obtains interactive immersive experience by integrating a graphics system, an optical system, a gesture tracking system, and a control system. The VR scenario is usually implemented using a head mounted display (HMD) device. As shown in FIG. 1, an HMD includes a processor (including a central processing unit (CPU), a graphical processing unit (GPU), a cache, a register, and the like), a display element, an acoustic element, a memory, physical hardware, and the like.

Most existing HMD products use physical hardware such as a handle or a touchpad, or a head aim system to perform an interface control operation, and the interface control operation is used as user input of an entire HMD device.

Handles generally include one or more keys including up, down, left, right, tap and exit. Some handles include a location tracking function for detecting rotation and displacement of the handles. Touchpads generally support an upward instruction, a downward instruction, a leftward instruction, a rightward instruction, and a tap instruction, and an extra key needs to be disposed to implement an exit instruction. The head aim system tracks a head gesture using an inertial measurement unit (IMU) sensor. A viewpoint location in the middle of two eyes is used as an aim point, and a tap command is implemented after the aim point hovers over an icon for a period of time. All operation instructions need to be implemented by setting keys using software.

The other approaches mainly have three disadvantages.

(1) A control function is limited and instruction implementation efficiency is low, instructions include only an upward instruction, a downward instruction, a leftward instruction, a rightward instruction, and a tap instruction, which hardly support a complex operation. A plurality of operations usually needs to be performed to position and select content.

(2) A control operation is not user-friendly, easily causing fatigue, a control operation using a touchpad requires holding a hand for a long time, and an operation performed in a head aim manner requires frequent head-turning.

(3) After an HMD device is worn, a user cannot see an external environment. Consequently, it is difficult to find a handle or a touchpad, usually causing incidental touch.

SUMMARY

In view of the above, embodiments of the present disclosure provide a gesture control method applied to a VR device, and an apparatus. A gesture operation is performed to implement user-friendly interaction of an HMD device.

A "gesture" in this application document does not emphasize a shape of a palm but emphasizes a hand itself, and when a location of a hand is described, the hand may be understood as a centroid.

According to a first aspect, an embodiment of the present disclosure provides a gesture control method applied to a VR device, and the method includes obtaining gesture location information of a user of the VR device, and presenting, in a display interface of the VR device, an operation icon corresponding to the gesture location information, detecting a depth distance between a hand of the user and the depth sensor, where the depth distance is a distance from the depth sensor to a primary plane on which a hand centroid is located or a distance from the depth sensor to a hand centroid, the primary plane is parallel to a display interface, and the depth distance varies in real time, determining a size relationship between a current depth distance and a preset depth threshold, and determining, as a to-be-operated object, an object that is in the display interface and that is currently corresponding to the operation icon if the current depth distance is not greater than the preset depth threshold, determining a size relationship between a new current depth distance and the preset depth threshold after the to-be-operated object is determined, and performing a preset command operation on a currently determined to-be-operated object if the new current depth distance is greater than the preset depth threshold.

According to this method, the user can control the VR device, especially control an application on a display page and control the page, without requiring external hardware input, thereby simplifying an operation manner of the user, and providing desired operation experience for the user.

According to a second aspect, an embodiment of the present disclosure provides an apparatus with a gesture control function, and the apparatus is applied to a VR device that includes a depth sensor. The apparatus includes an obtaining module configured to obtain gesture location information of a user of the VR device, and present, in a display interface of the VR device, an operation icon corresponding to the gesture location information, a detection module configured to detect a depth distance between a hand of the user and the depth sensor, where the depth distance is a distance from the depth sensor to a primary plane on which a hand centroid is located or a distance from the depth sensor to a hand centroid, the primary plane is parallel to a display interface, and the depth distance varies in real time, a determining module configured to determine a size relationship between the depth distance detected by the detection module and a preset depth threshold, and an execution module configured to if the determining module determines that the current depth distance is not greater than the preset depth threshold, determine, as a to-be-operated object, an object that is in the display interface and that is currently corresponding to the operation icon, and perform a preset command operation on the to-be-operated object if the determining module determines that a new depth distance is greater than the preset depth threshold after the to-be-operated object is determined.

The apparatus enables the user to control the VR device, especially control an application on a display page and control the page, without requiring external hardware input, thereby simplifying an operation manner of the user, and providing desired operation experience for the user.

In a possible design according to the first aspect or the second aspect, when the object that is in the display interface and that is currently corresponding to the operation icon is a first object, the first object may be an application (icon), types of files (icon), and function keys in a variety of operation interfaces, such as a WECHAT application icon, a media file icon, or a progress bar positioning identifier in a playing interface, and the first object is determined as the current to-be-operated object. After the to-be-operated object is determined and it is detected that the hand of the user pushes forward and the depth distance of the hand is greater than the preset depth threshold, the first object may be opened, deleted, dragged, or activated, or a preset command operation box pops up. These functions may be predefined by the user, and a principle is similar to setting a shortcut key. Certainly, the depth distance of the hand in an entire process of the foregoing command operations needs to be greater than the preset depth threshold.

Using the foregoing technical solution, the user can perform a preset operation command on the current to-be-operated object by pushing the hand forward till the depth distance exceeds the preset depth threshold, thereby providing operation convenience and desired operation experience.

In a possible design according to the first aspect or the second aspect, when a gesture corresponds to blank space in the display interface, i.e., when the object that is in the display interface and that is currently corresponding to the operation icon is a current page, the current page is determined as the to-be-operated object. Then, if it is detected that the hand of the user pushes forward and the depth distance of the hand is greater than the preset depth threshold, a page flipping operation may be activated on the current page. If the user continues to slide leftward, page-left can be implemented. Similarly, if the user continues to slide rightward, page-right can be implemented. By analogy, page-up and page-down may also be performed. Certainly, the depth distance of the hand needs to be greater than the preset depth threshold in an entire page flipping process.

Using the foregoing technical solution, the user can execute a preset operation command on the current to-be-operated page by pushing the hand forward till the depth distance exceeds the preset depth threshold, thereby providing operation convenience and desired operation experience.

In a possible design according to the first aspect or the second aspect, the VR device includes a working state, and the working state is a preset command operation-performing state when the preset command operation is performed on the currently determined to-be-operated object. The user may perform a preset exit action if the user wants to exit the current preset command operation-performing state. When a sensor system detects the preset exit action, the VR device exits the working state of performing the preset command operation on the to-be-operated object. A commonly seen preset exit action includes a specific hand-waving motion, a return to a selection area, fist-clenching, a particular hand shape, a specific finger track, or the like. In addition, in this design, a corresponding function module in the apparatus with a gesture control function is a returning module, and corresponding hardware may be a sensor system and a processor.

Using the foregoing technical solution, the user exits a current command operation state at any time by performing a preset exit action such that operations of the user are flexible, and a misoperation that may be caused because the hand of the user always stays in a command area is avoided.

In a possible design according to the first aspect or the second aspect, when the depth distance of the hand of the user is detected in a depth operation area, the depth distance of the hand of the user is prompted in the display interface. A prompt manner may include but is not limited to a hand depth progress bar, a real-time hand operation side view of the user, a color change prompt corresponding to a hand depth, a voice change prompt corresponding to a hand depth, or the like. The depth operation area is an area formed by a first plane and a second plane, both the first plane and the second plane are parallel to the display interface, a distance from the depth sensor to the first plane is greater than the preset depth threshold, and a distance from the depth sensor to the second plane is less than the preset depth threshold. In addition, in this design, a corresponding function module in the apparatus with a gesture control function is a prompt module, and corresponding hardware may be a processor.

Using the foregoing technical solution, a user more clearly learns using a depth location prompt in an interface, of a depth location and an operation area corresponding to the hand of the user in a current external environment such that the user clearly perceives and controls a hand motion to be performed by the user to avoid a misoperation.

According to a third aspect, an embodiment of the present disclosure provides a VR device with a gesture control function, and the device includes at least a processor, a memory, a sensor system, and a bus. The processor is connected to and communicates with the memory and the sensor system using the bus.

The sensor system is configured to obtain gesture location information of a user of the VR device, and is further configured to detect a depth distance between a hand of the user and a depth sensor, where the depth distance is a distance from the depth sensor to a primary plane on which a hand centroid is located or a distance from the depth sensor to a hand centroid, the primary plane is parallel to a display interface, and the depth distance varies in real time.

The memory stores a program and an instruction, and further stores a preset depth threshold.

The processor invokes the program and the instruction in the memory to present, in the display interface of the VR device, an operation icon corresponding to the gesture location information, determine a size relationship between a current depth distance and the preset depth threshold, and determine, as the to-be-operated object, an object that is in the display interface and that is currently corresponding to the operation icon if the current depth distance is not greater than the preset depth threshold, determine a size relationship between a new current depth distance and the preset depth threshold after the to-be-operated object is determined, and perform a preset command operation on the to-be-operated object if the new current depth distance is greater than the preset depth threshold.

According to a fourth aspect, an embodiment of the present disclosure provides a VR device, and the VR device has a corresponding function of implementing the foregoing method. The function may be implemented by hardware, or may be implemented by hardware by executing corresponding software. The hardware or software includes one or more modules corresponding to the foregoing function.

According to a fifth aspect, an embodiment of the present disclosure provides a computer storage medium configured to store a computer software instruction used by the foregoing VR device to perform an operation. The computer software instruction includes a program designed to execute the foregoing aspects.

The technical solutions in the foregoing possible designs may be combined without going against nature.

According to the gesture control method, the apparatus, and the device provided in the embodiments of the present disclosure, the user can control the VR device, especially control operation objects such as an application, a file, a function key, and a page on the display page, without requiring external hardware, thereby simplifying an operation manner of the user of the VR device, and providing desired operation experience for the user.

DESCRIPTION OF EMBODIMENTS

Embodiments of the present disclosure provide a gesture control method applied to a VR device, and an apparatus.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that a restrictive word such as "first", "second", "preset", "target", and "primary" in this application document is merely a distinction for ease of description, and is not a limitation on an order or not a dedicated word.

Figure 2:
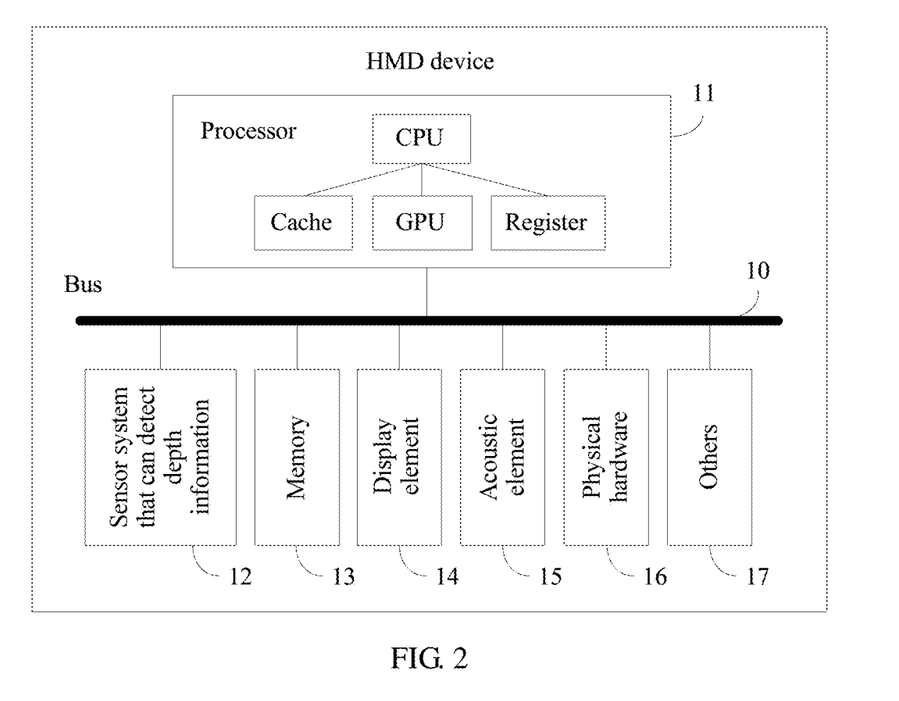
FIG. 2 is a schematic diagram of an HMD device according to an embodiment of the present disclosure.

An HMD device on which the present disclosure is based is shown in FIG. 2, and the HMD device includes a processor 11, a sensor system 12, a memory 13, a display element 14, an acoustic element 15, and physical hardware 16.

The processor 11 is configured to generate a corresponding operation control signal, send the operation control signal to a corresponding part of the device, and read and process data in software, especially read and process data and a program in the memory such that each function module in the device performs a corresponding function, to control a corresponding part to perform an action according to an instruction requirement. For example, the processor 11 is applied to a variety of media processing algorithms, including man-machine interaction, motion tracking/prediction, rendering display, audio processing, and the like. The sensor system 12 is configured to collect, obtain, or send information, including image information and distance information, such as hand information in the present disclosure. The sensor system 12 in the present disclosure may include a 3-axis or 6-axis sensor, and is configured to obtain motion information of the HMD device, for example, an angular velocity and a linear acceleration, position, track, and recognize a hand motion, and present the recognized hand motion in a display screen of the VR device. The sensor system 12 further obtains static and dynamic features of the hand. Static characteristic information includes a fingertip fixed point, palm centroid, a hand joint, and the like. Features of this type are usually obtained using single frame data. Dynamic characteristic information includes a displacement vector, a moving speed, and the like. Such characteristic information is usually obtained using multi-frame data. Because the foregoing is a mature other approaches, details are not described in this application document. Compared with the other approaches, the sensor system 12 in the present disclosure includes a depth sensor. The depth sensor included in the sensor system 12 may be sensor hardware dedicated for depth detection or a functional software module for depth detection to obtain depth information of a hand, and integrate into user-interface interaction. The sensor system 12 may further store some specific program instructions.

The memory 13 is configured to store the program and various data, and mainly store software units such as an operating system, an application, and a function instruction, or a subset thereof, or an extension set thereof. The memory 13 may further include a non-volatile random access memory (RAM) (NVRAM) that provides the processor 11 with hardware, software and data resources for managing a computing and processing device. The NVRAM supports software control and an application, and is further configured to store a multimedia file, a running program, and an application.

The display element 14 generally includes a display screen and a supporting optical component, and is configured to display content. A display interface is usually presented on a display screen to perform man-machine interaction and file browsing.

The acoustic element 15 is a microphone, a loudspeaker, a headset, or the like, and is configured to output a sound.

The physical hardware 16 is a physical function key such as an on/off key, a volume key, or a mechanical control key.

In addition to the foregoing parts 11 to 16, the device may further include another component 17 configured to enrich functions of the device and beautify appearance of the device.

The foregoing hardware 11 to 16 and the other hardware 17 may be electrically connected using a bus 10 to implement coupling and communication.

Figure 3:
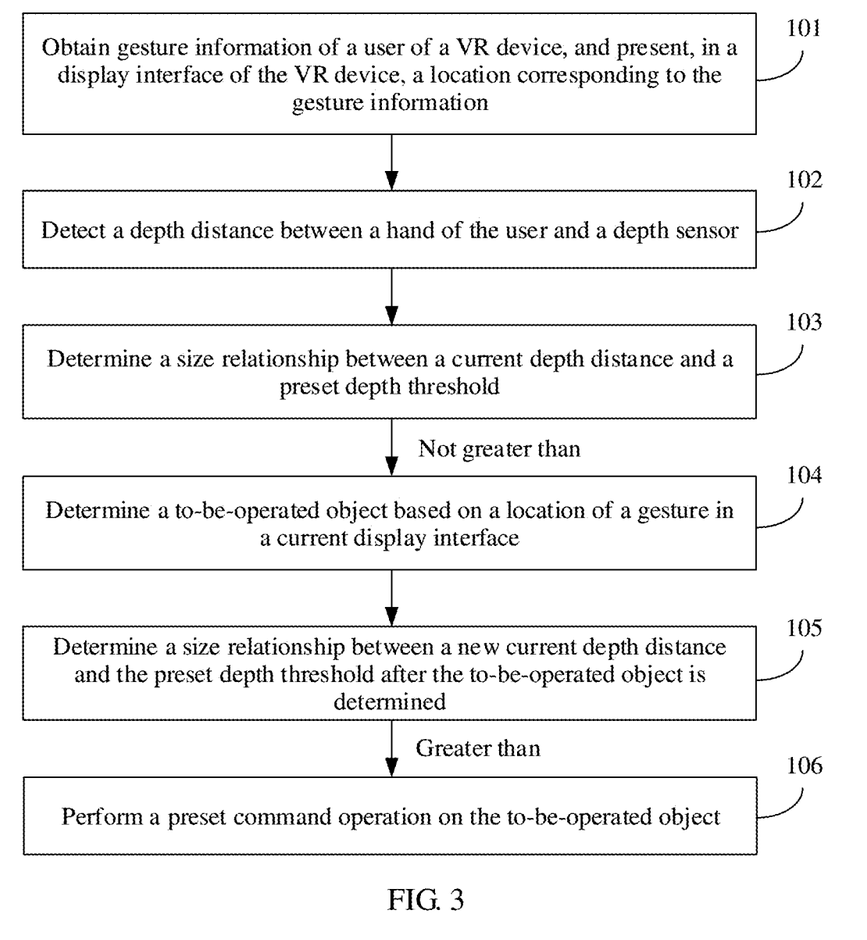
FIG. 3 is a flowchart of a gesture control method for a VR device according to an embodiment of the present disclosure.

Referring to FIG. 3, a procedure of a gesture control method for a VR device according to the present disclosure includes the following steps, where the device includes a depth sensor.

Step 101. Obtain gesture location information of a user of the VR device, and present, in a display interface of the VR device, an icon corresponding to the gesture location information.

In a specific implementation process, hand (namely, hand centroid) information of the user is obtained using a binocular camera in a sensor system. In addition, a hand location status of the user usually varies in real time. The hand information obtained by the sensor system is mapped to a field of view of the VR device, and a motion track of the hand is mapped as an operation icon (such as a hand shape cursor or an arrow cursor, where an operation icon in this application may also be referred to as a cursor), and is displayed in the display interface of the VR device in real time. In this way, the user is clearly aware of a real-time situation of operating an operation object in the display interface by the user. Two-dimensional mapping in the display interface is mainly dependent on horizontal information x and longitudinal information y. The "horizontal" and "longitudinal" herein are relative to the sensor system. A positive direction of a coordinate vector may be preset by the user. This step usually includes preprocessing of an image, such as noise reduction and contour enhancement.

Mapping of a hand location to a display interface may be completed by a processor by invoking a program instruction in a memory.

The other approaches used in this step include hand positioning performed by extracting a hand contour and a hand shape, and tracking a gesture motion. Extraction of a hand contour is usually obtained using a segmentation algorithm, for example, a color information-based algorithm, a depth information-based algorithm, and a gradient information-based algorithm. A corresponding hand centroid may be calculated by obtaining a contour and a shape of the hand and then applying a mathematical method on a geometric image of the contour and the shape. Tracking of a gesture is implemented using a motion tracking algorithm, such as mean shift, continuous adaptive mean shift (CAM-Shift), and an optical flow method. These other approaches algorithms may be completed by the processor by invoking a program instruction in the memory.

Step 102. Detect a depth distance between a hand of the user and the depth sensor.

In a specific operation process, the user wears the VR device, and therefore a location of the sensor system is relatively still, but the hand of the user is moving in real time. Therefore, three-dimensional information of the hand of the user relative to a sensor unit varies in real time, and the depth distance $d_0$ varies in real time, i.e., the depth distance $d_0$ is a variable. The depth sensor in the sensor system can obtain depth information z in the three-dimensional information of the hand of the user, and the depth information z may also be referred to as a depth distance. The depth distance is a distance from the depth sensor to a primary plane on which a palm centroid is located. The primary plane is parallel to a display interface of the VR device, or may be understood as being parallel to a display screen of the VR device. This parallel relationship allows a specific minor error.

In addition, in an allowed error range, the depth distance may alternatively be preset to a distance from the depth sensor to a hand centroid. These preset program instructions may be preset in the memory or the sensor system.

Detection of the depth distance in this step may be completed by the sensor system by detecting the distance, and the processor performs subsequent processing and calculation. Once a working state of the depth sensor is started, detection of a motion of the hand is performed within a detection range of the sensor, and a detection action is performed throughout an entire man-machine interaction process in which the user uses the VR device. The detection action or a procedure step shown in FIG. 3 may be triggered by an internal clock of the VR device or a terminal. For example, detection or the procedure step is performed at a time interval. The time interval may be a preset value (for example, 0.1 millisecond (ms)), or may be randomly changed (for example, changed based on a measured hand motion speed).

Step 103. Determine a size relationship between a current depth distance and a preset depth threshold.

An inventive idea of the present disclosure is proposing a gesture control manner in which different operation function areas are obtained through division performed based on a depth distance. A philosophy of the present disclosure is dividing a hand operation area of the user into a selection area and a command area based on a depth distance from the hand to the depth sensor unit.

The present disclosure may determine, based on a relationship between a set parameter (such as the preset depth threshold or a randomly set index) and the detected depth distance, whether a related preset condition is met. The preset condition may be a size relationship obtained by comparing the depth distance with the preset depth threshold, a comparison or calculation (mathematical equation) relationship between the depth distance and a plurality of preset depth thresholds, or another configurable rule. Determining the size relationship between the current depth distance and the preset depth threshold is merely an example of determining whether the related preset condition is met.

A specific design philosophy may be based on setting a "virtual screen" (namely, a virtual plane, where a distance from the depth sensor to the virtual screen is a preset depth threshold d, and in a specific implementation process, a set location of the virtual screen allows a specific error range, for example, the distance from the depth sensor to the virtual screen may be any value in a range $[d*(1-a\%), d*(1+a\%)]$, and a is usually not greater than 3). A gesture in a selection area near to one side of the user body can control a cursor to slide to select a to-be-operated object, and a gesture in the command area away from the user body can implement a command operation performed on the selected to-be-operated object. The gesture location information varies in real time, and therefore the size relationship between the depth distance and the preset depth threshold is determined in real time.

Therefore, the size relationship between the depth distance and the preset depth threshold needs to be determined to distinguish between functions of operations. If a determining result is that the depth distance is not greater than the preset depth threshold, for example, the depth distance $d_0$ is 0.5 d, 0.9 d, 0.95 d, or the like (the depth distance $d_0$ needs to be less than $d*(1-a\%)$ if the set error of the virtual screen is considered), step 104 is performed, where d, a, and the like may be an example of the set parameter.

If a determining result obtained after the first operation is greater than the preset depth threshold or another parameter, the gesture may not result in any function response.

The determining process in this step may be completed by the processor by invoking a program instruction in the memory. A determining action may be performed throughout an entire man-machine interaction process in which the user uses the VR device. Once the sensor system starts to work and the depth sensor obtains the depth distance $d_0$, the processor compares the depth distance with the preset depth threshold.

Step 104. Perform one or more preset man-machine interface actions if the current depth distance is not greater than the preset depth threshold. For example, a to-be-operated object may be determined based on a location of a gesture in the display interface.

Figure 4:
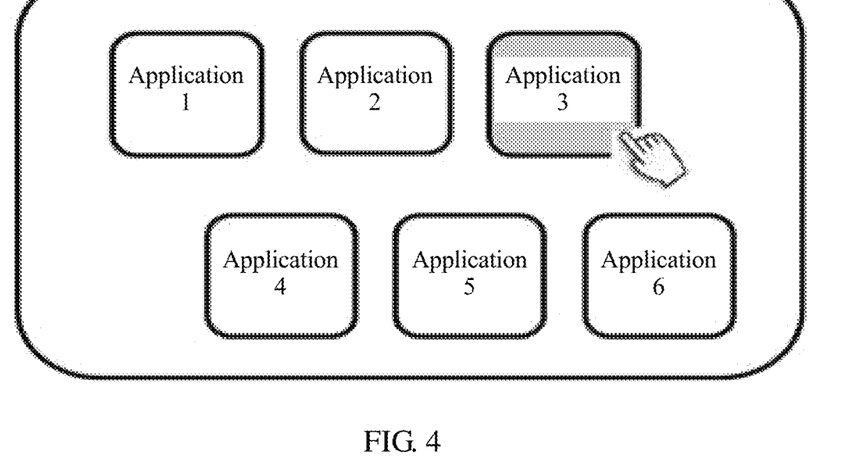
FIG. 4 is a schematic diagram of determining a to-be-operated object according to an embodiment of the present disclosure.

In the selection area, a movement of the hand corresponds to a movement of a cursor in the display interface of the VR device. In a process in which the hand moves, an operation icon moves over an operation object in a current interface, and an operation object on which the operation icon stays in real time is a real-time to-be-operated object. The real-time to-be-operated object may be an application, a specific multimedia file, content on an application web page, a function key in an application operation interface, a sub-operation command dialog box, a current page, or the like. The user may move the hand to move a corresponding operation icon to a desired operation object, and an object currently corresponding to the cursor is a current to-be-operated object. Referring to FIG. 4, the current to-be-operated object may have a color that is more conspicuous than that of an unselected object. In the present disclosure, because a gesture location of the user varies in real time, a selected to-be-operated object also varies in real time. Therefore, the to-be-operated object mentioned in this step is for an object corresponding to a current gesture such that the to-be-operated object may be updated in real time.

In this step, a process of determining the to-be-operated object may be completed by the processor by invoking a program instruction in the memory.

Step 105. Determine a size relationship between a new current depth distance and the preset depth threshold after the to-be-operated object is determined.

If the new current depth distance is still not greater than the preset depth threshold, a to-be-operated object-determining state persists. If the new current depth distance is still greater than the preset depth threshold, for example, the depth distance $d_0$ is 1.05 d, 1.1 d, 1.3 d, or the like (the depth distance $d_0$ needs to be greater than d*(1+a %) if the set error of the virtual screen is considered), step 106 is performed, where d, a, and the like may be an example of the set parameter.

Step 106. If the new current depth distance is greater than the preset depth threshold, perform a preset man-machine interface action that meets this condition, for example, perform a preset command operation on the to-be-operated object.

After the user selects the to-be-operated object, a next step is performing an operation on the to-be-operated object, and then the user only needs to move the hand forward to enter the command area. In addition, the VR device detects that a value of the depth distance $d_0$ of the hand of the user gradually increases, and once the new current depth distance $d_0$ is greater than the preset depth threshold, a preset command operation may be triggered on the to-be-operated object.

In this step, a process of performing a command operation on the to-be-operated object may be completed by the processor by invoking a program instruction in the memory.

In a specific implementation process, the operation icon may be corresponding to an application in the display interface (for example, an icon of an application such as WECHAT, Le Video, IQIYI, SINA, FACEBOOK, or TAOBAO). If it is detected that the hand of the user moves forward after WECHAT is determined as the currently selected to-be-operated object, when the depth distance of the hand is greater than the preset depth threshold, WECHAT may be opened or deleted, or a preset command operation box of WECHAT pops up.

In a specific implementation process, the operation icon may be corresponding to a function key in the display interface (for example, a positioning identifier on a progress bar in a player and a function key for controlling a display mode). If it is detected that the hand of the user moves forward after a positioning identifier on a playing progress bar is determined as the to-be-operated object, when the depth distance of the hand is greater than the preset depth threshold, the positioning identifier may be activated such that a subsequent operation such as dragging may be performed to adjust a playing progress.

In a specific implementation process, the operation icon may be corresponding to a file in the display interface. If it is detected that the hand of the user moves forward after the film "Kung Fu Panda" is determined as the to-be-operated object, when the depth distance of the hand is greater than the preset depth threshold, the film may be played or deleted, or a command operation box of the film pops up.

In a specific implementation process, the operation icon may be corresponding to blank space in the display interface. If it is detected that the hand of the user moves forward after a current page in the display interface is determined as the to-be-operated object, when the depth distance of the hand is greater than the preset depth threshold, a page flipping command may be activated on the current page. If the user continues to slide leftward in the command area, page-left can be implemented. Similarly, if the user continues to slide rightward in the command area, page-right can be implemented. By analogy, page-up and page-down may also be performed. In a process of such a subsequent expansion action, a hand depth distance may be greater than the preset depth threshold, or may not necessarily be constrained by a value of the depth distance. This is set in advance by the user.

It should be understood that, in the foregoing instances, setting an action instruction in the command area is similar to setting a shortcut key. Therefore, the preset command operation may be freely defined by the user. There is an excessively large quantity of definable command operations, and no enumeration is provided in this application document.

In addition, the VR device includes a working state, and the working state is a preset command operation-performing state when a preset command operation is performed on the currently determined to-be-operated object. However, the user cannot unlimitedly perform a preset command operation in the command area. After a preset operation command performed by the user on the current to-be-operated object in the command area is completed, a further requirement is searching for a new to-be-operated object or browsing file content. Therefore, it is necessary for the user to flexibly exit the state of performing the preset command operation on the to-be-operated object. In this case, the user may perform a preset exit action, and after the sensor unit detects the preset exit action, exit the working state of performing the preset command operation on the to-be-operated object. A commonly seen preset exit action includes but is not limited to a hand-waving motion, a return to the selection area, fist-clenching, a specific hand shape, and the like. Detection of a real-time action of the user may be implemented by the sensor system, and program data corresponding to a preset action may be stored in the memory.

The processor may determine, by invoking a program instruction in the memory, whether to subsequently perform an exit operation.

Figure 5:
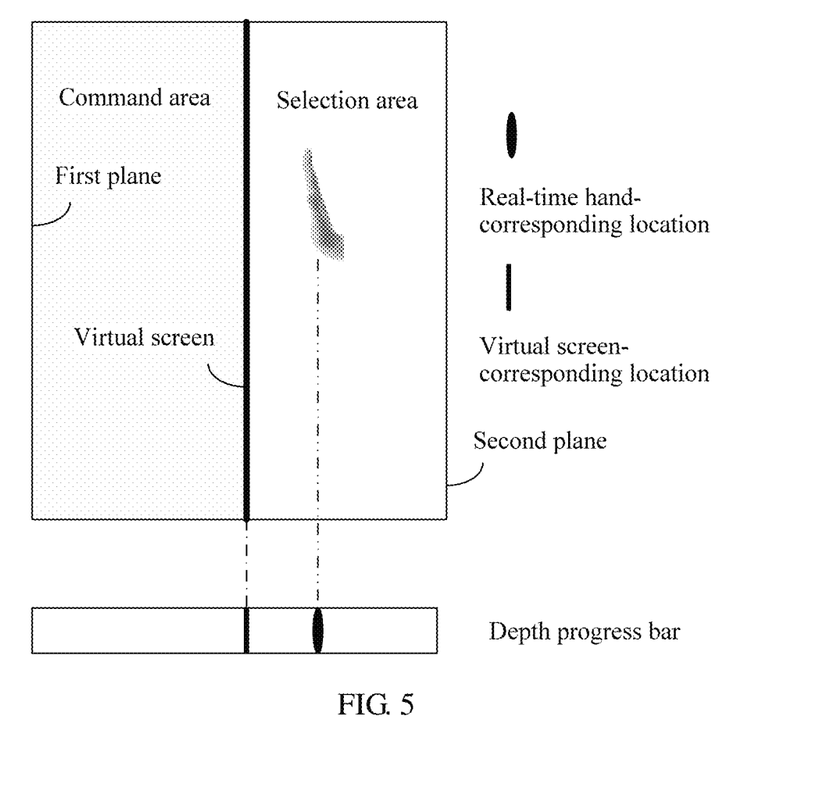
FIG. 5 is a schematic diagram of prompting a depth distance according to an embodiment of the present disclosure.

In addition, to better provide a user with definite depth perception in a process of the foregoing operation, an embodiment of the present disclosure further provides a method for prompting a depth distance of a hand. In a specific implementation, FIG. 5 shows a left view of an operation. A plane on which a conceptual virtual screen is located is shown using a long black solid line in the figure. A distance from a depth sensor to the virtual screen is equal to a preset depth threshold, and an entire spatial area in front of and behind the virtual screen and in which an effective depth operation can be performed is referred to as a depth operation area. The depth operation area is an area formed by a first plane and a second plane. Both the first plane and the second plane are located in front of the user (the first plane and the second plane are usually parallel to the display interface, and a specific tilt angle is allowed in a specific allowed error range). A distance from the depth sensor to the first plane is greater than the preset depth threshold, and a distance from the depth sensor to the second plane is less than the preset depth threshold. It is not difficult to understand that an area formed between the first plane and the virtual screen is a command operation area, and an area formed between the second plane and the virtual screen is a selection operation area. When a depth distance of the hand of the user is detected in the depth operation area, a real-time depth location of the hand of the user is prompted in the display interface. A prompt manner may include but is not limited to using a depth progress bar (shown in FIG. 5) corresponding to a value of the depth distance, using a side view of a real-time operation of the user, using a color prompt corresponding to the value of the depth distance, using a sound prompt corresponding to the value of the depth distance, and the like. The depth operation area is also a location area that is flexibly defined by the user based on an operation habit of the user. When operating a VR device, the user cannot see an outside situation because the user wears an HMD. Consequently, the user cannot determine a depth degree of a hand movement of the user. However, with a depth distance prompt, the user can know a depth situation of a hand movement of the user even being unaware of the outside, and can confirm, based on prompt information, whether the hand of the user currently performs a selection operation or a command operation, to avoid a misoperation. For example, when the user performs the selection operation and is about to enter the command area incidentally, a prompt of entering the command area is provided for the user in the display interface. The user may adjust back the depth distance of the hand based on the prompt. If the user is going to perform the command operation, the user needs to determine that the depth distance of the hand is greater than the preset depth threshold. In this case, the user can obtain specific confirmation prompt information only after the depth distance of the hand of the user exceeds the preset depth threshold, and the user may then determine that the user currently performs the command operation.

Optionally, a color or an image of a corresponding operation icon in the display interface when the user is in the selection area may be different from that when the user is in the command area. For example, a corresponding operation icon in the display interface when the hand of the user moves in the selection area may be green, and a corresponding operation icon in the display interface when the hand of the user moves in the command area may be red. Optionally, in a process in which the hand of the user in the selection area gradually approaches a location of the "virtual screen", the color of the operation icon may gradually change in terms of color tone. For another example, when the hand of the user moves in the selection area, the corresponding operation icon in the display interface may be an arrow image, and when the hand of the user moves in the command area, the corresponding operation icon in the display interface may be a palm image. For another example, a location of the virtual screen described in the foregoing embodiment may be flexibly set to [d*(1−a %), d*(1+a %)]. An action transition area may be provided for the user to avoid a misoperation.

The transition area is an area between the depth sensor and the virtual screen, where a range of a distance between the depth sensor and the virtual screen is [d*(1−a %), d*(1+a %)], and it is preset that a user operation is not responded temporarily. Therefore, a location prompt of the transition area needs to be provided in the display interface through, for example, color distinction or icon distinction. It should be understood that setting a color or an image and a gradual-changing effect of an intermediate process may be preset by the user.

In the foregoing prompt method, detection of a real-time depth distance of the hand may be implemented by the sensor system, and the preset depth threshold and program data corresponding to other preset information may be stored in the sensor system or the memory. The processor may compare the real-time depth distance with the preset depth threshold by invoking the program data, and present a real-time comparison result in the display interface in a real-time prompt state.

This embodiment of the present disclosure provides the gesture control method applied to the VR device. The gesture location information of the user of the VR device is obtained, the distance between the hand of the user and the depth sensor is detected using the depth sensor, and the size relationship between the current depth distance and the preset depth threshold is determined, if the current depth distance is not greater than the preset depth threshold, the object corresponding to the current operation icon in the display interface is determined as the to-be-operated object, after the to-be-operated object is determined, the size relationship between the new current depth distance and the preset depth threshold is determined, and if the new current depth distance is greater than the preset depth threshold, the preset command operation is performed on the to-be-operated object. In this way, the hand operation area of the user can be divided into the selection area and the command area that are respectively corresponding to an action instruction for implementing a selection function and an action instruction for implementing a command function. According to this method, the user can control the VR device, especially control a variety of objects in the display interface, without requiring external mechanical input hardware, thereby simplifying an operation manner of the user, and providing desired operation experience for the user.

Figure 6:
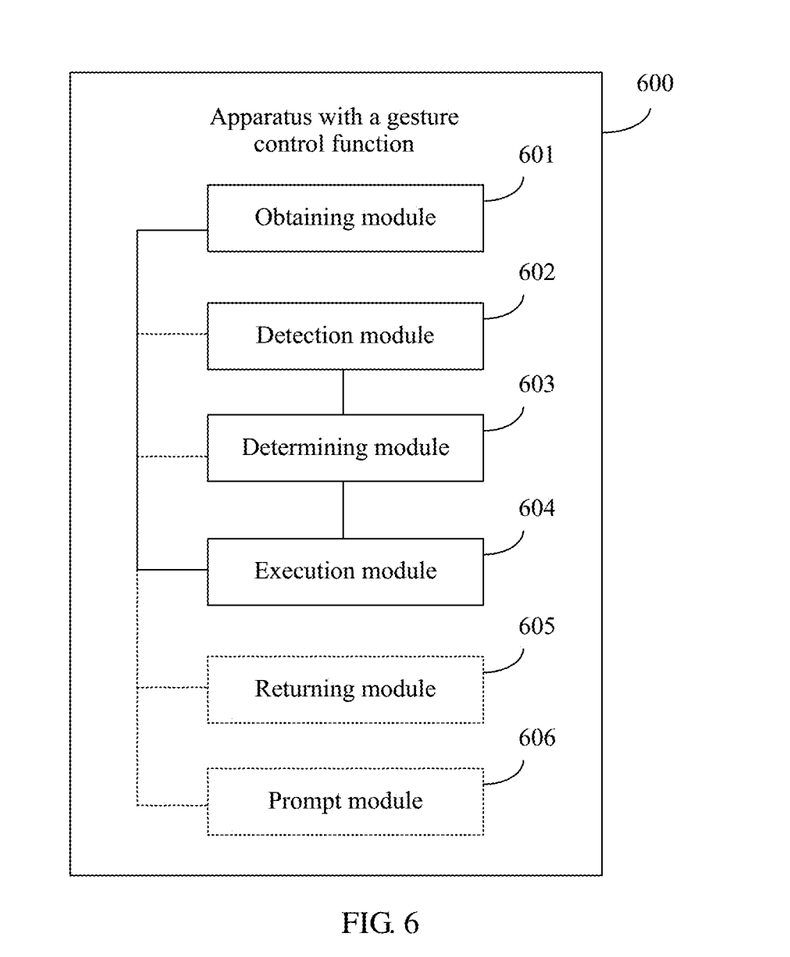
FIG. 6 is a schematic diagram of an apparatus with a gesture control function according to an embodiment of the present disclosure.

FIG. 6 shows an apparatus with a gesture control function 600 according to an embodiment of the present disclosure, and the apparatus 600 is applied to a VR device that includes a depth sensor. The apparatus 600 includes an obtaining module 601, a detection module 602, a determining module 603, and an execution module 604.

The obtaining module 601 is configured to obtain gesture location information of a user of the VR device, and may present, in a display interface of the VR device, an operation icon corresponding to the gesture location information. The obtaining module 601 may be implemented jointly by a sensor system and a processor. For example, gesture location information obtained by a binocular camera and a dedicated image sensor in the sensor system may be processed by the processor, presented in a corresponding display interface, and used as an input signal.

The detection module 602 is configured to detect a depth distance between a hand of the user and the depth sensor, where the depth distance is a distance from the depth sensor to a primary plane on which a hand centroid is located or a distance from the depth sensor to a hand centroid, the primary plane is parallel to a display interface, and the depth distance varies in real time. The detection module 602 may be implemented using a specific sensor in the sensor system, for example, a depth sensor or a dedicated distance sensor. A preset parameter of the sensor may be preset in a memory or the sensor system.

The determining module 603 is configured to determine a size relationship between the depth distance detected by the detection module and a preset depth threshold. The determining module 603 may be implemented by the processor.

The execution module 604 is configured to determine, as a to-be-operated object, an object that is in the display interface and that is currently corresponding to the operation icon if the determining module 603 determines that the current depth distance is not greater than the preset depth threshold, and perform a preset command operation on the to-be-operated object if the determining module 603 determines that a new depth distance is greater than the preset depth threshold after determining the to-be-operated object. The execution module 604 may be implemented by the processor.

In a specific implementation process, the obtaining module 601 is further configured to perform the method mentioned in step 101 and an equivalent replacement method, the detection module 602 is further configured to perform the method mentioned in step 102 and an equivalent replacement method, the determining module 603 is further configured to perform the method mentioned in step 103, the method mentioned in step 105, and equivalent replacement methods, and the determining module 603 may determine, based on a specified relationship between a preset parameter and a detected depth distance, which preset conditions can be met. The execution module 604 determines or chooses to implement a corresponding man-machine interface function (or action) based on a condition that is met as determined. For example, the execution module 604 may be further configured to perform methods mentioned in step 104 and step 106, and equivalent replacement methods.

The VR device includes a working state, and the execution module is in a preset command operation-performing state when the execution module performs the preset command operation. In a specific instance, the apparatus 600 may enter the preset command operation-performing state when the to-be-operated object is determined or according to another instruction action. In a specific implementation process, the apparatus 600 may further include a returning module 605, and the returning module 605 is configured to, when it is detected, after the execution module 604 performs the preset command operation on the to-be-operated object, that the user performs a preset exit action, control the execution module 604 to exit the preset command operation-performing state. A specific implementation process and an instance are similar to those described in the foregoing method embodiment, and details are not described herein again. The returning module 605 may be implemented jointly by a sensor system and a processor. Detection of a real-time action of the user may be implemented by the sensor system, and program data corresponding to the preset action may be stored in a memory. The processor may compare the real-time action with the preset action by invoking a program instruction in the memory to determine whether to subsequently perform an exit operation.

In a specific implementation process, the apparatus 600 may further include a prompt module 606, where the prompt module 606 is configured to prompt the depth distance of the hand of the user in the display interface when the detection module 602 detects the depth distance of the hand of the user in a depth operation area. The depth operation area is an area formed by a first plane and a second plane, both the first plane and the second plane are parallel to the display interface, a distance from the depth sensor to the first plane is greater than the preset depth threshold, and a distance from the depth sensor to the second plane is less than the preset depth threshold. A specific implementation process and an instance are similar to those described in the foregoing method embodiment, and details are not described herein again. The prompt module may be implemented by a processor. Detection of a real-time depth distance of the hand is implemented by the sensor system, and program data corresponding to the preset depth threshold may be stored in the memory. The processor may compare the real-time depth distance with the preset depth threshold by invoking a program instruction in the memory, and present a real-time comparison result in the display interface in a real-time prompt state.

It should be understood that an additional method, a representation extension, a supplementary description, an example description, and the like in the foregoing method embodiment are also applicable to method execution in this apparatus.

The technical solution of the present disclosure provides the apparatus with the gesture control function, where the apparatus includes the foregoing modules 601 to 604 that jointly implement steps 101 to 106 and equivalent replacement implementations such that a user can control the VR device, especially control an object on the display page and control the page, without requiring external hardware, thereby simplifying an operation manner of the user, and providing desired operation experience for the user.

A person of ordinary skill in the art may be aware that, the methods or algorithm steps described with reference to the content disclosed in the present disclosure may be implemented in a hardware manner, or may be implemented in a manner of executing a software instruction by a processor. The software instruction may include a corresponding software module. The software module may be stored in a RAM, a flash memory, a read-only memory (ROM), an erasable programmable ROM (EPROM), an electrically EPROM (EEPROM), a register, a hard disk, a removable hard disk, a compact disc ROM (CD-ROM), or a storage medium in any other forms well-known in the art. A storage medium used as an example is coupled to the processor such that the processor can read information from the storage medium, and can write information into the storage medium. Certainly, the storage medium may be a part of the processor. The processor and the storage medium may be located in an application-specific integrated circuit (ASIC). In addition, the ASIC may be located in user equipment. Certainly, the processor and the storage medium may exist in the user equipment as discrete components.

A person skilled in the art should be aware that in one or more of the foregoing examples, the functions described in the present disclosure may be implemented using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A gesture control method applied to a virtual reality (VR) device that comprises a depth sensor, wherein the gesture control method comprises:
   obtaining gesture location information of a user of the VR device;
   presenting, in a display interface of the VR device, an operation icon corresponding to the gesture location information;
   detecting a depth distance between a hand of the user and the depth sensor;
   providing, in response to detecting the depth distance, the user with an indication of the depth distance of the hand in the display interface, wherein the indication comprises a depth progress bar corresponding to the depth distance or a sound prompt corresponding to the depth distance;
   dividing, based on the indication, a depth operation area of the user into a selection area and a command area according to the depth distance, wherein the selection area is formed when the depth distance is not greater than a first preset depth threshold, and wherein the command area is formed when the depth distance is greater than a second preset depth threshold;
   determining an object in the display interface that corresponds to the operation icon as a to-be-operated object and displaying the operation icon in the selection area;
   receiving a user operation, performing a preset command operation corresponding to the user operation on a currently determined to-be-operated object in the display interface that corresponds to the operation icon, and displaying the operation icon in the command area;
   receiving the user operation and not performing any command operation on the currently determined to-be-operated object in the display interface that corresponds to the operation icon when the depth distance is between the first preset depth threshold and the second preset depth threshold, wherein an action transition area is between the first preset depth threshold and the second preset depth threshold, and wherein the action transition area is configured for avoiding a user misoperation;
   detecting a preset exit action after performing the preset command operation on the currently determined to-be-operated object; and
   exiting a working state of the VR device in response to detecting the preset exit action.

2. The gesture control method of claim 1, wherein the currently determined to-be-operated object is a first application, and wherein the preset command operation comprises opening the first application, deleting the first application, or displaying a command operation box of the first application.

3. The gesture control method of claim 1, wherein the currently determined to-be-operated object is a current page, and wherein the preset command operation comprises activating a page flipping command on the current page.

4. The gesture control method of claim 1, wherein the currently determined to-be-operated object is a first media file, and wherein the preset command operation comprises opening the first media file, deleting the first media file, or displaying a command operation box of the first media file.

5. The gesture control method of claim 1, wherein the currently determined to-be-operated object is a first function key, and wherein the preset command operation comprises activating a function of the first function key.

6. The gesture control method of claim 1, wherein the working state is a preset command operation-performing state when the preset command operation is performed on the currently determined to-be-operated object.

7. The gesture control method of claim 1, wherein the depth distance of the hand of the user is detected in the depth operation area, wherein the depth operation area is an area formed by a first plane and a second plane, wherein both the first plane and the second plane are parallel to the display interface, wherein a distance from the depth sensor to the first plane is greater than a preset depth threshold, and wherein a distance from the depth sensor to the second plane is less than the preset depth threshold.

8. The gesture control method of claim 1, wherein the indication further comprises a side view of a real-time operation of the user or a color prompt corresponding to a value of the depth distance.

9. The gesture control method of claim 1, further comprising displaying the operation icon in different colors.

10. The gesture control method of claim 1, wherein the first preset depth threshold is a first product of a preset value and a difference between one and a set error percentage, wherein the second preset depth threshold is a second product of the preset value and a sum of one and the set error percentage, and wherein the set error percentage is greater than zero percentage.

11. An apparatus with a gesture control function that is applied to a virtual reality (VR) device comprising a depth sensor, wherein the apparatus comprises:
   a memory comprising instructions; and
   a processor coupled to the memory, wherein the instructions cause the processor to be configured to:
      obtain gesture location information of a user of the VR device;
      present, in a display interface of the VR device, an operation icon corresponding to the gesture location information;
      detect a depth distance between a hand of the user and the depth sensor;
      provide, in response to detecting the depth distance, the user with an indication of the depth distance of the hand in the display interface, wherein the indication comprises a depth progress bar corresponding to the depth distance or a sound prompt corresponding to the depth distance;
      divide, based on the indication, a depth operation area of the user into a selection area and a command area according to the depth distance, wherein the selection area is formed when the depth distance is not greater than a first preset depth threshold, and wherein the command area is formed when the depth distance is greater than a second preset depth threshold;
      determine an object in the display interface that corresponds to the operation icon as a to-be-operated object and display the operation icon in the selection area;
      receive a user operation, perform a preset command operation corresponding to the user operation on a currently determined to-be-operated object in the display interface that corresponds to the operation icon, and display the operation icon in the command area;

receive the user operation and not perform any command operation on the currently determined to-be-operated object in the display interface that corresponds to the operation icon when the depth distance is between the first depth threshold and the second depth threshold, wherein the selection area is configured for determining the to-be-operated object, wherein an action transition area is between the first depth threshold and the second depth threshold, and wherein the action transition area is configured for avoiding a user misoperation;

detect a preset exit action after performing the preset command operation on the currently determined to-be-operated object; and exit a working state of the VR device in response to detecting the preset exit action.

12. The apparatus of claim 11, wherein the currently determined to-be-operated object is a first application, and wherein the preset command operation comprises opening the first application, deleting the first application, or displaying a command operation box of the first application.

13. The apparatus of claim 11, wherein the currently determined to-be-operated object is a current page, and wherein the preset command operation comprises activating a page flipping command on the current page.

14. The apparatus of claim 11, wherein the currently determined to-be-operated object is a first media file, and wherein the preset command operation comprises opening the first media file, deleting the first media file, or displaying a command operation box of the first media file.

15. The apparatus of claim 11, wherein the currently determined to-be-operated object is a first function key, and wherein the preset command operation comprises activating a function of the first function key.

16. The apparatus of claim 11, wherein the working state is a preset command operation-performing state when the preset command operation is performed on the currently determined to-be-operated object.

17. The apparatus of claim 11, wherein the depth distance of the hand of the user is detected in the depth operation area, wherein the depth operation area is an area formed by a first plane and a second plane, wherein both the first plane and the second plane are parallel to the display interface, wherein a distance from the depth sensor to the first plane is greater than the first preset depth threshold, and wherein a distance from the depth sensor to the second plane is less than the second preset depth threshold.

18. The apparatus of claim 11, wherein the indication further comprises a side view of a real-time operation of the user or a color prompt corresponding to a value of the depth distance.

19. The apparatus of claim 11, wherein the instructions cause the processor to be configured to display the operation icon in different colors, wherein the first preset depth threshold is a first product of a preset value and a difference between one and a set error percentage, wherein the second preset depth threshold is a second product of the preset value and a sum of one and the set error percentage, and wherein the set error percentage is greater than zero percentage.

20. A computer program product comprising computer-executable instructions stored on a non-transitory computer-readable medium that, when executed by a processor, cause a virtual reality (VR) device to:

obtain gesture location information of a user of the VR device;

present, in a display interface of the VR device, an operation icon corresponding to the gesture location information;

detect a depth distance between a hand of the user and a depth sensor of the VR device;

provide, in response to detecting the depth distance, the user with an indication of the depth distance of the hand in the display interface, wherein the indication comprises a depth progress bar corresponding to the depth distance or a sound prompt corresponding to the depth distance;

divide, based on the indication, a depth operation area of the user into a selection area and a command area according to the depth distance, wherein the selection area is formed when the depth distance is not greater than a first preset depth threshold, and wherein the command area is formed when the depth distance is greater than a second preset depth threshold;

determine an object in the display interface that corresponds to the operation icon as a to-be-operated object and display the operation icon in the selection area;

receive a user operation, perform a preset command operation corresponding to the user operation on a currently determined to-be-operated object in the display interface that corresponds to the operation icon, and display the operation icon in the command area;

receive the user operation and not perform any command operation on the currently determined to-be-operated object in the display interface that corresponds to the operation icon when the depth distance is between the first depth threshold and the second depth threshold, wherein the selection area is configured for determining the to-be-operated object, wherein an action transition area is between the first depth threshold and the second depth threshold, and wherein the action transition area is configured for avoiding a user misoperation;

detect a preset exit action after performing the preset command operation on the currently determined to-be-operated object; and exit a working state of the VR device in response to detecting the preset exit action.

* * * * *